United States Patent [19]

Ishii

[11] Patent Number: 5,766,518

[45] Date of Patent: Jun. 16, 1998

[54] LIGHT MODULATING MATERIALS

[75] Inventor: Takafumi Ishii, Yokohama, Japan

[73] Assignee: Nippon Oil Company, Limited, Tokyo, Japan

[21] Appl. No.: 684,219

[22] Filed: Jul. 19, 1996

[30] Foreign Application Priority Data

Jul. 20, 1995 [JP] Japan ................... 7-213891

[51] Int. Cl.$^6$ .................. F21V 9/00; C09K 19/52
[52] U.S. Cl. .................. 252/582; 252/299.01
[58] Field of Search .................. 252/299.01, 582, 252/299.62

[56] References Cited

U.S. PATENT DOCUMENTS

| | | | |
|---|---|---|---|
| 3,446,181 | 5/1969 | Cooley et al. | 252/582 X |
| 5,512,215 | 4/1996 | Tachizono et al. | 252/584 |
| 5,514,296 | 5/1996 | Chen et al. | 252/299.01 |
| 5,554,707 | 9/1996 | Nagase et al. | 526/279 |
| 5,585,035 | 12/1996 | Nerad et al. | 252/299.01 |

FOREIGN PATENT DOCUMENTS

| | | |
|---|---|---|
| 2-161091 | 6/1990 | Japan . |
| 3-266814 | 11/1991 | Japan . |

*Primary Examiner*—C. H. Kelly
*Attorney, Agent, or Firm*—Scully, Scott, Murphy & Presser

[57] ABSTRACT

A light modulating material having an excellent energy saving effect as window materials and others which comprises as a main component member a laminate wherein a liquid crystalline material is placed over at least one light transmitting substrate, said laminate having properties of a light transmittance of not less than 50% at a wavelength of 400–750 nm at an overall temperature from not lower than 273K to not higher than 313K, a light transmittance of not less than 60% at a wavelength of 750–2000 nm at an overall temperature from not lower than 273K to low than 288K and a light transmittance of not more than 40% and a light reflectance of not less than 50% at a wavelength of 750–2000 nm at a wavelength of 750–2000 nm at an overall temperature from not lower than 298K to not higher than 313K.

20 Claims, 9 Drawing Sheets

LIGHT MODULATING MATERIALS

FIELD OF THE INVENTION

This invention relates to a light modulating material which may modulate a light transmission and a light reflectance of a light having a specific wave length in sun light utilizing a specific property of a liquid crystal upon changes in temperatures, and may contribute energy-saving.

BACKGROUND OF THE INVENTION

Recently, there has been increased a tendency to use window glasses having various functions in big buildings in order to reduce an energy for air conditioning. These glasses are classified broadly into heat radiation reflective glasses and heat radiation absorptive glasses.

Both heat radiation reflective glasses and heat radiation absorptive glasses have a glass surface coated with a metal oxide, whereby an infrared ray in sun light may be reflected or absorbed to prevent a rise in temperature in a building and eliminate a load for air conditioning. However, when such glasses are employed, there are presented the problems in that a transmission for a visible light may be reduced to cause an increase in an energy for illumination and further that heat radiation could not be introduced into a room during winter season to cause an increase in heating load.

In order to prevent an increase in heating load during winter season, there has been attempted to utilize a material which is capable of freely controlling a light transmission and there has been studied, for instance, an electrochromic material which may alter a light transmission by application of electric field. However, it has been required therefore to prepare an electrical wiring by providing a transparent electrode over the glass surface, which has to incur a higher expense. And further, there has been presented the problem that a glass itself tends to have an elevated temperature because a reduced transmission may be brought about not by light reflection but by light absorption and then secondary radiation may be caused. In order to eliminate this problem, there has been further presented the another problem that any further means such as use of a Low-e glass is required and thus results in a far higher expense.

Recently, there has been studied utilization of a thermochromic material as other materials than those electrochromic materials. This has utilized changes in plasma frequency on temperatures by applying a specific thin film of a metal oxide to the glass surface and attempted to provide a low reflectance at a low temperature and a high reflectance at a high temperature. This method if worked ideally may overcome the aforesaid problems in principle, but the present status is that this method could not be actually put to practical use because of a small change in reflectance when any change in temperature is brought about.

BRIEF SUMMARY OF THE INVENTION

This invention relates to a light modulating material which may modulate a light transmission and a light reflectance of light having a specific wave length in sun light utilizing a specific property of a liquid crystal upon changes in temperatures.

More specifically, this invention relates to 1) a light modulating material which comprises as a main component member a laminate wherein a liquid crystalline material is place over at least one light transmitting substrate, said laminate having properties of a light transmittance of not less than 50% at a wavelength of 400–750 nm at an overall temperature from not lower than 273K to not higher than 313K, a light transmittance of not less than 60% at a wavelength of 750–2000 nm at an overall temperature of not more than 40% and a light reflectance of not more than 50% at a wavelength of 750–2000 nm at a wavelength of 750–2000 nm at an overall temperature from not lower than 298K to not higher than 313K.

According to another aspect of this invention, it relates to 2) a light modulating material as disclosed in the above item 1) wherein said liquid crystalline material has a clearing point of higher than 313K and a crystallization temperature of lower than 273K.

According to a still another aspect of this invention, it relates to 3) a light modulating material as disclosed in the above item 1) wherein said liquid crystalline material has a clearing point of higher than 313K and a glass transition temperature of lower than 288K.

According to a still further aspect of this invention, it relates to 4) a light modulating material as disclosed in any of the above items 1) to 3) wherein said liquid crystalline material has a cholesteric-smectic phase transition point in a temperature range from not lower than 288K to lower than 298K.

According to other aspect of this invention, it relates to a light modulating material as disclosed in any of the above item 1) to 4) which comprises at least one of optically ally active liquid crystalline compounds.

BRIEF DESCRIPTION OF THE DRAWINGS

In FIGS. 8 and 9, the figures have the following meanings: 1=a transmitting substrate, 2 and 2' an orientation layer, 3 and 3'=a sealing material, 4=a liquid crystalline material, 5=a spacer and 6=a protective material.

DETAILED EXPLANATION OF THE INVENTION

This invention will be more fully illustrated hereafter.

The light transmittance and light reflectance as used herein are defined as below, respectivelyl.

A light transmittance at a wavelength of Xnm-Ynm means to be the S as defined by the following equation, defining a transmittance at a wavelength of λnm as T(λ) and an energy density of sun light at a wavelength of λnm as E(λ):

$$S = \frac{\int_X^Y T(\lambda) \cdot E(\lambda) d\lambda}{\int_X^Y E(\lambda) d\lambda} \quad (1)$$

while a light reflectance at a wavelength of Xnm-Ynm means to be the Q as defined by the following equation, defining a reflectance at a wavelength of λ nm as R(λ) and an energy density of sun light at a wavelength of λ nm as E(λ):

$$Q = \frac{\int_X^Y R(\lambda) \cdot E(\lambda) d\lambda}{\int_X^Y E(\lambda) d\lambda} \quad (2)$$

Figure 1:
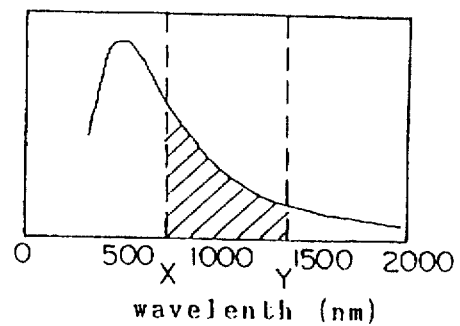
FIG. 1 is a spectrum chart showing an energy distribution of a sun light approximated with black body radiation at 6000 k.

Solar energy reaching to the earth's surface exhibits a complicated wave length distribution by influence of absorption or scattering through atmosphere, but Uesaka et al. reported that a whole form thereof is nearly approximate to a black body radiation of 6000K (Collection of Lecture Papers on Solar/Wind Force Energy, p.153, 1994). FIG. 1 shows a sun light spectrum approximated to a black body radiation of 6000K.

Figure 2:
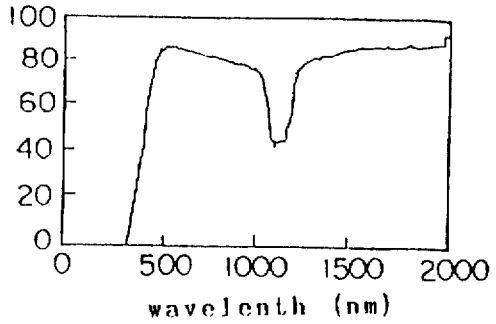
FIG. 2 is a spectrum chart showing a light transmittance of a certain material.
Figure 3:
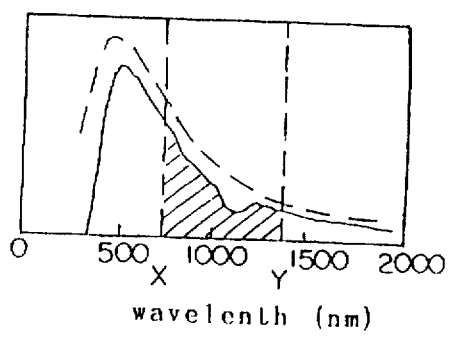
FIG. 3 is a spectrum chart showing an energy distribution of a transmitted light when sun light is transmitted through a certain material having the light transmittance of FIG. 2.

When sun light is transmitted through the object having a light transmittance spectrum such as that as shown in FIG. 2, the transmittance spectrum is drawn as the spectrum represented by a solid line in FIG. 3. The light transmittance at a wavelength of Xnm-Ynm transmitted through the object can be derived from the area ratio of the oblique line portions of FIG. 1 and FIG. 3. This can be expressed by the equation (1). Similarly, light reflectance can be derived by the equation (2) upon the above way of thinking. From the foregoing, the light transmittance and reflectance of this invention are defined according to the equations (1) and (2), respectively.

In the above light transmittance, a light having a wavelength of 400–750 nm such as sun light is generally in the region of a visible light and then the light transmittance in the said region should be maintained over a certain numerical value. As one example, the window to be attached to a building is one of illumination means to take a light such as sun light into a room and, therefore, if such a transmittance could not be maintained, then an energy required for illumination should be increased and an energy-saving effect could not be relatively obtained.

The light modulating material of this invention can maintain a light transmittance of not less than 50% at an overall temperature in the range of not lower than 273K to not higher than 313K, preferably not less than 60%, more preferably not less than 70% and far more preferably not less than 80%. If the light transmittance within the region of a visible light may be maintained as defined above, any increase in illumination energy and so on could not be brought about.

In sun light, a light in a heat wave region of a wave length of 750–2000 nm may be utilized as a heating means at a low atmospheric temperature during winter season and others, but when an atmospheric temperature will be elevated during summer season and others, it is likely that a far more elevated room temperature may be induced by the said light. The light modulating material of this invention can maintain a light transmittance of not less than 50% at an overall temperature in the range of not lower than 273K to not higher than 313K, preferably not less than 60%. If the said light transmittance is less than 60%, an energy to be applied for heating will be increased, which could not lead to energy-saving.

Also, it is possible at an overall temperature in the range of not lower than 298K to lower than 313K to reduce a light transmittance of the said light at a wavelength of 750–2000 nm to not more than 40%, preferably not more than 30%, and more preferably not more than 20%. If more than 40%, an energy for air conditioning will be undesirably increased. The reduced light transmittance in a heat wave region at an overall temperature in the range of not lower than 298K to lower than 313K is provided not by light absorption with a light modulating material, but by light reflection with the said material. It is likely that the reduction by absorption may provide the light modulating material with heat by an absorbed light and the problem of secondary radiation from the said material may be presented. The present light modulating material can decrease a light transmission in a heat wave region only by reflection. The light reflectance in heat wave region can be provided by physical reflection with a transparent substrate and, preferably, selective reflection with a liquid crystal as explained below and a light reflectance of a heat wave or ray of a wavelength of 750–2000 nm is not less than 50%, preferably not less than 60%, more preferably not less than 70%. And, not less than 80% of the said light reflectance may be preferably provided by selective reflection of a liquid crystal.

Light transmittance and light reflectance in the above heat wave region can be optionally controlled by the change of the orientation form of a liquid crystalline material placed on a light transmitting substance caused by changing temperatures.

Generally, a liquid crystal is known to have the three molecular orientations of a cholesteric phase, a smectic phase and a nematic phase.

Cholesteric phase has a helical molecular orientation and a property to reflect the light having an equal wavelength to its helical period. This property is called selective reflection. The light modulating material of this invention is contemplated to utilize, for instance, this selective reflectance to reflect only a heat wave in sun light, thereby accomplishing energy-saving.

In the said selective reflection, if only the light having an equal wave length to the period of a cholesteric phase may be reflected, a portion of the heat wave to be reflected is limited to a very small part thereof solely; however, as actual selective reflection may be exerted to a certain region, almost all region of a heat wave can be reflected. It was reported that it can be approximated by the product of a double refraction, an optical anisotropy of a liquid crystal, and a central wavelength of selective reflection what extent of region of light may be reflected H. F. Gleeson, H. J. Coles, Mol.Cryst.Liq.Cryst., 1709–1734 (1989).

On the other hand, a smectic phase may show not only a molecular orientation but also a certain order in regard to a center of gravity in a molecule. Smectic phase may be finely classified to smectic A1, smectic A2, smectic B, smectic C, smectic E etc. on differences in an order of a center of gravity, or the relationship between the gravity center order and the orientated direction of a molecule. Any smectic phases may be preferably employed in this invention. These smectic phases do not exert selective reflection unlike the cholesteric phase.

Preferable liquid crystalline materials which may be employed in this invention are one or plural liquid crystalline compounds which may take the state of both cholesteric and smectic phases as stated above. Of these liquid crystalline compounds, many compounds may form a smectic phase at low temperature and a cholesteric phase at a high temperature. Accordingly, in this instance, as a temperature of a cholesteric phase is lowered, the phase may be changed to a smectic phase, that is, phase transition may be brought about. This phase transition may be either reversible or irreversible and the liquid crystalline materials which may be employed in this invention may be preferably reversible. If the phase transition is irreversible, there will be presented the following problems. As one example, there will be explained below the case where a liquid crystalline material composed of a liquid crystalline compound is employed, the said compound having the property that a smectic phase is developed only during the temperature is increasing not during the temperature is decreasing. In FIG. 4, there was not presented any particular problem until a glass phase as elevated is phase-transited to a cholesteric phase via a smectic phase. However, immediately when a temperature of a cholesteric phase is lowered, vitrification will be started. This state means that a cholesteric phase is fixed at a lowered temperature so that, when the light in a heat wave region would be desired to be maintained, for example, during winter season, the light in heat wave region could be eventually reflected. If such a problem may be arisen, the effect of energy-saving cannot be accomplished. Accordingly, where a liquid crystalline material having a cholesteric-smectic phase transition is employed in this invention, its phase transition should be preferably reversible.

A liquid crystalline material layer in this invention may form preferably a cholesteric phase at a temperature of not less than 298K. The said cholesteric phase has a peculiar property of selective reflection as explained above. By this selective reflection, it can reflect the light of a wavelength of 750–2000 nm at an overall temperature in the range of not lower than 298K to not higher than 313K and reduce transmittance to the said light.

The liquid crystalline material which may be employed in this invention may produce a phase transition preferably from a cholesteric phase to a smectic phase in the temperature range of not lower than 288K to lower than 298K.

This temperature range is the range wherein the heat by the influence of a heat wave is hardly felt and no unpleasant feeling by heat wave can be experienced, nor energy by an air conditioner is consumed. Accordingly, a light transmittance of a wavelength of 750–2000 nm may be of any numerical values. In a temperature range of not lower than 273K to lower than 288K, the liquid crystalline material forms smectic phase or a vitrification state of smectic phase so that reflection in a heat wave region, i.e., selective reflection by a cholesteric phase could not be brought about.

Generally, as a temperature of a smectic phase is lowered, either a smectic phase is vitrified and fixed as the said state is or crystallization is brought about at a certain temperature. For instance, if crystallization of the said liquid crystalline material is induced during winter season, when the light modulating material is used as a window material, there may be presented the problem that the window is misted to lose its transparency. In order to prevent the problem as mentioned above from occurring, the liquid crystalline material may be preferably a material which has a crystallization temperature sufficient to be as low as lower than 273K or wherein a smectic phase is vitrified without any occurrence of crystallization.

The mechanism of action of the present light modulating material will be explained below in greater detail, in regard to the case where the preferred embodiment of the present invention is used, that is, a liquid crystalline material wherein light reflection of a heat wave region may be brought about by selective reflection of a cholesteric phase.

Cholesteric phase has helically orientated molecules and a specific property of the so called selective reflection, i.e., a phenomenon to reflect the light having a wavelength equal to their helical period, and a wavelength range of the selectively reflected light, i.e., a width of reflection spectrum may be approximated to the product of a central wavelength of selective reflection and birefringence of a liquid crystal. The said reflection spectrum width is broader as birefringence of a liquid crystal forming cholesteric phase is higher, and birefringence of the liquid crystalline material which may be employed in this invention is not less than 0.15, preferably not less than 0.20 and more preferably not less than 0.25. The birefringence as referred to herein is to be a numerical value at a temperature of 30° C. and a wave length of 1000 nm. If the birefringence is less than 0.15, reflection of a heat wave is undesirably brought about insufficiently, which leads to difficulty in energy-saving as intended.

Generally, birefringence may be easily measured in a liquid crystal having no optically active components by the incidence of polarization into Abbe's refractometer. Also, in the case of a liquid crystal having optically active components, birefringence may be indirectly measured by measuring a racemate of the said liquid crystal.

Of sun light, a light having a wavelength of not less than 400 nm to less than 750 nm is a visible light so that it is necessary to ensure a certain light transmittance. On the other hand, energy in heat wave region is concentrated in short wavelength region near visible light, while a sun light energy is not substantially found in a wavelength region beyond a wavelength of 2000 nm. Then, when an atmospheric temperature is higher, for example, during summer season, a central wavelength of selective reflection in a cholesteric phase should be in an ultrared light region approximate to a visible light. More specifically, the center of selective reflection may be desirably in the range of not less than 750 nm to less than 1200 nm in the temperature range of not lower than 298K to lower than 313K. If the said center may be out of the above-defined range, a sufficient energy-saving is not likely to be accomplished.

A wavelength region of selective reflection may be optionally prepared, for example, by controlling a mix rate and an optical purity of an optically active substance in a liquid crystalline material as explained below. Illustratively speaking, a wavelength of selective reflection will be narrowed by increasing a mix rate of an optically active substance or by increasing an optical purity as explained below.

A liquid crystalline material which may be employed in this invention will be illustrated below. The said liquid crystalline material may be composed of a mixture containing one or plural liquid crystalline compounds, preferably at least one optically active liquid crystalline compound.

The liquid crystalline compounds in this invention are not particularly critical if they may have the properties as depicted above. Illustratively, there may be mentioned those compounds having the following chemical formulae (1) and/or (2):

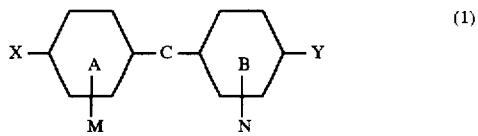
(1)

In the above chemical formula (1), the rings A and B are selected from the group consisting of a 1,4-phenylene group, a 2,5-pyridylene group, a 2,6-pyrimidine-1,4-diyl group, a 4,4'-biphenylene group, a cyclohexylbenzene-4,4'-diyl group, a 6-phenylpyridine-3,4'-diyl group, a 5-phenylpyridine-2,4'-diyl group, a 2-phenyl-1,3-pyrimidine-4,4'-diyl group and a 2-phenyl-1,3-pyrimidine-4,4'-diyl group, a 2,6'-naphthylnyl group, and the rings A and B may be the same or different. The binding group C is selected from the group consisting of a single bond, an ester group, a trans-1,2-ethenediyl group, an acetylene group, a 1,3'-butadiyne-1,4-diyl group, an azoxy group and an azomethine group. The substituents M and N are selected from the group consisting of a hydrogen atom, a methyl group, a fluorine atom, a chlorine group and a trifluoromethyl group and the substituents M and N may be the same or different. The positions of the substituents M and N to be substituted may be at any positions of the rings A and B. The terminal groups X and Y are selected from the group consisting of a straight chain alkyl group of 4–12 carbon numbers, an alkyl group having as a branched chain an alkyl group of not more than 3 carbon numbers at any optional position of the said alkyl group, a straight chain alkoxy group of 4–12 carbon numbers an alkoxy group having as a branched chain an alkyl group of not more than 3 carbon numbers at any optional position of the said alkoxy group and a cyano group and the X and Y may be the same or different. More illustratively, there may be mentioned the following compounds:

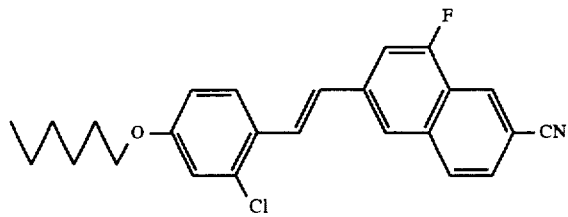
(3)

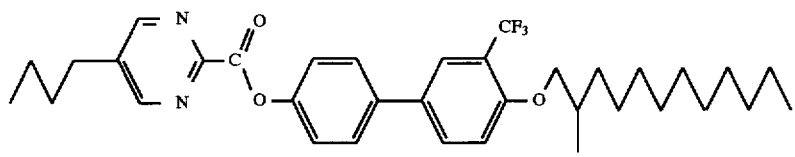
(4)

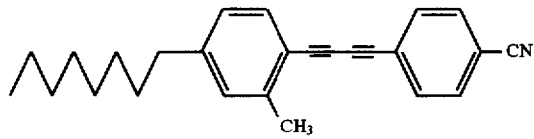
(5)

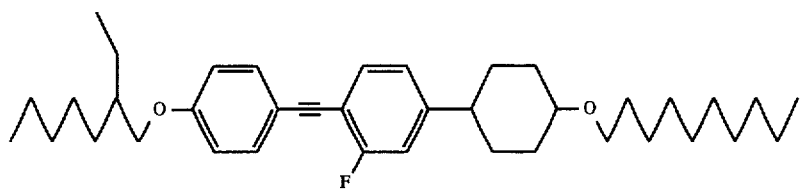
(6)

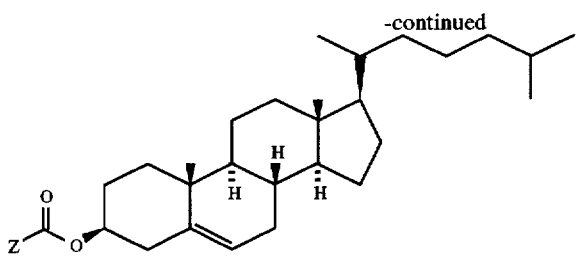

(2)

In the above formula (2), Z is a straight chain alkyl group of 1-9 carbon numbers or a straight chain alkoxy group of 1-9 carbon numbers. More illustratively, there may be mentioned the following compounds:

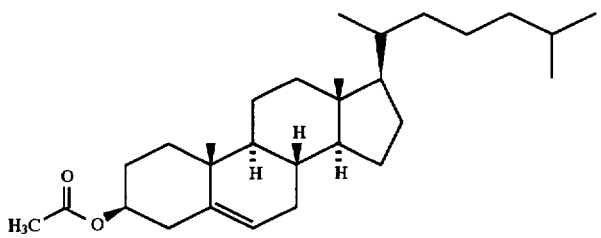

(7)

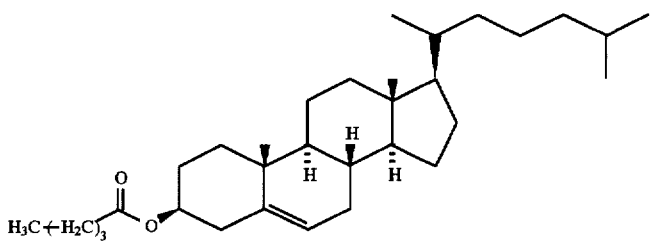

(8)

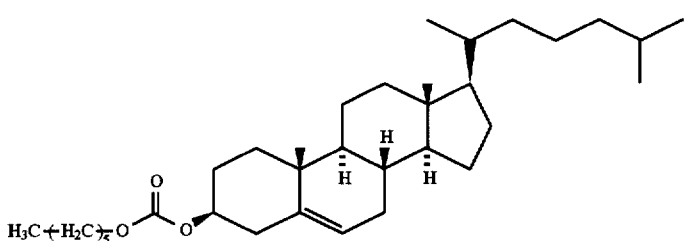

(9)

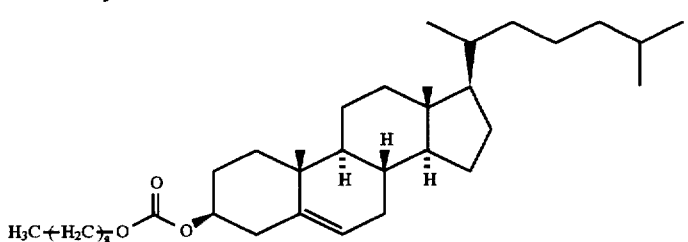

(10)

In this invention, it is rather preferable to use a mixture of two or more thereof than one of them alone. Illustratively, there may be mentioned a mixture of at least two different compounds having the formula (1), a mixture of at least one compound having the formula (1) with at least one compound having the formula (2) or a mixture of at least two different compounds having the formula (2) and a mixture of at least two different compounds having the formula (1) or a mixture of at least one compound having the formula (1) with at least one compound having the formula (2) may be preferably employed as a liquid crystalline material of this invention. And, if used as a mixture, at least one of the mixture may be preferably an optically active liquid crystalline compound. As the optically active compound, there may be preferably employed any compounds well-known as components of a liquid crystal and they may be illustrated by 4-((s)-2-methylbutyl)-4'-cyanobiphenyl and the like.

As illustrative examples of the mixture, a mixture of the compound (3) with the compound (4), a mixture of the compound (5) with the compound (9) and the like may be preferably employed as a liquid crystalline material of this invention.

One of the liquid crystalline compounds as mentioned above may be used alone, but it is likely that crystallization may occur when one of them alone is used. Also, it is likely that a mixture of at least two different compounds of the formula (2) may show a smaller birefringence.

Then, a light transmitting substrate which may be used in this invention will be explained below.

As the materials for said substrate, there may be mentioned inorganic glasses such as elementary glasses of, e.g., Si, Se, Te and the like, hydrogen-bound glasses of, e.g., $HPO_3$, $H_3PO_4$ and the like, fluoride glasses of, e.g., $BeF_2$, oxide glasses of, e.g., $SiO_2$, $B_2O_3$, $P_2O_5$ and the like, chloride glasses of, e.g., $ZnCl_2$ and the like, sulfide glasses of, e.g., $GeS_2$, $As_2S_3$ and the like, carbonate glasses of, e.g., $K_2CO_3$, $MgCO_3$ and the like, nitrate glasses of, e.g., $NaNO_3$, $KNO_3$, $AGNO_3$ and the like, sulfate glasses of, e.g., $Na_2S_2O_3$ $H_2O$, $Ti_2SO_4$ and the like; or organic glasses such as poly(methyl methacrylate), polystyrene, poly(vinyl chloride), polyethylene, polycarbonate, polyethersulfone, polyphenylenesulfide and the like.

In the above transmitting substrate, it is necessary to control orientation of a cholesteric phase in order that a light in a heat wave region may be effectively reflected by selective reflection which is a preferred embodiment of this invention. It may be controlled by applying an orientation treatment to the said transmitting substrate.

For orientation of the transmitting substrate, there may be illustratively employed any techniques well-known in the field of relevant art. Orientation treatment may be carried out, for example, by forming a thin film by means of a method wherein a solution of lecithin, stearic acid, hexadecyltrimethylammonium bromide, octadecylamine hydrochloride, carbon, polyoxyethylene, polyvinyl alcohol, polyimide, a monobasic chromium complex, e.g., a myristic acid-chromium complex, a perfluorononanic acid-chromium complex and the like, a dibasic carboxylic acid-chromium complex, e.g., a brassylic acid-chromium complex and the like or an organic silane is coated on the surface of the substrate and then the solvent is removed, for example, by drying under heating; a method wherein a low molecular weight substance having an orientating ability such as hexamethyldisiloxane, perfluorodimethylcyclohexane, tetrafluoroethylene, acetylene etc. is adhered with polymerization onto the surface of the substrate by plasma discharge; a method wherein a polymeric substance having an orientating ability such as polytetrafluoroethylene etc. is adhered onto the surface of the substrate by the action of a high electric field and others. The said thin film may be formed directly on the substrate surface or may be laminated on the substrate surface with the said thin film previously and separately formed at other part than the substrate surface as an orientation layer.

In addition, there may be mentioned, as an orientation method, a rubbing method wherein a substrate surface or a surface over which a thin film is formed according to any of the above-mentioned methods is rubbed toward one direction with a cotton cloth or a cotton wool; an ion beam method wherein an ion beam is etched by irradiation of a ion beam from an oblique angle; a oblique deposit method wherein an oxide such as $SiO_2$ and others is deposited onto a substrate surface from an oblique angle; a plasma method wherein a substrate surface is etched by an oxygen plasma and the like; a pickup coating method wherein a substrate is immersed in a solution of a polymer and the like to apply a pickup coating, and orientation may be applied to a transmitting substrate surface according to any adequate method. Of the orientation methods referred to above, a parallel orientation is preferable and it may be preferably used to form a thin film of a polyimide, a poly(vinyl alcohol) and the like and then apply rubbing treatment thereto.

In this invention, the transmitting substrate orientated according to the above-mentioned method may be preferably arranged with a liquid crystalline material in such a manner that a molecular orientation of the said material may take a homogeneous molecular orientation or a Grandjean molecular orientation.

Onto the surface of a liquid crystalline material layer not adjacent to a transmitting substrate, a film-like or plate-like layer made from a transparent and optically isotropic material such as the same material as that for the said transmitting substrate may be laminated as a protective material onto the surface of a liquid crystalline material layer, in order to provide the liquid crystalline material layer with stability, weathering stability, stable orientation and so on; provided that the said protective material should be orientated in the same manner as a transmitting substrate and should not disarrange the orientation of a liquid crystal.

The light modulating material of this invention may be prepared, for example, according to the following process. Needless to say, this invention is not to be limited thereto.

First, a solution of polyamic acid for a liquid crystal orientation film is coated over the surface of a transmitting substrate, e.g., a glass substrate with a given size according to a suitable coating method such as spin-coating method to form a thin film and then heating the coated substrate to form a polyimide film over the glass substrate. The resulting polyimide film is subjected to rubbing treatment using a felt or a cloth according to an adequate well-known method. The said treatment provides the polyimide film formed over a glass substrate with a liquid crystal orientating ability to form an orientated film. The glass substrate is heated at 40°–80° C. using a hot plate or an air bath while keeping the glass substrate horizontally with the orientation layer being directed upward. Over the glass substrate with an orientation layer under heating, a liquid crystalline material as adequately prepared is warmed at that heating temperature. A method to place a liquid crystalline material onto a substrate may dependent on the physical properties of a liquid crystalline material and, where a liquid crystalline material is in a solid state at room temperature, it is placed on a substrate with an orientated film as it is solid, or a liquid crystalline material in a solid state at room temperature is previously molten by heating and coated over a substrate as it stands. Where it has a sufficient fluidity at room temperature, it is coated over a substrate according to any adequate method. After a liquid crystalline material is placed over a substrate according to any methods referred to above, a suitable material such as a glass globule with a given size etc. is sprayed as a spacer over a liquid crystalline material layer. Thereafter, it is orientated in the same manner as the above-mentioned transmitting material and covered with a transmitting substrate or a protective layer which is previously heated to 40°–80° C., an orientation layer being directed downward, so that the said orientation layer film is in a uniform contact with a liquid crystalline material. After a liquid crystalline material is put between the transmitting substrate with an orientation layer or the said substrate and the protective material, a well-known space formed with a width of the spacer between the substrate and another substrate or the protective material may sealed with a sealer such as an epoxy resin etc. to obtain a light modulating material.

As another preparation example, a transmitting substrate with an orientation layer is put together with a transparent with an orientation layer treated in the same manner as the said substrate or a protective material so that orientation layers are placed inward. A spacer is provided between them to seal its periphery, thereby previously forming a hollow cell. The hollow cell thus prepared is provided in its outer periphery with holes for injection of a liquid crystalline material at least two opposing positions. A liquid crystalline material is injected through the holes. It is desirable in injection to warm a liquid crystalline material and the hollow cell and make a liquid crystalline material to an isotropic phase. If not warmed, it is likely that a liquid crystal is generally of a high viscosity though dpending upon the liquid crystalline material used so that it may become difficulty to be injected into the hollow cell. As an alternative method for injection, one may adopt a convenient method wherein either hole is provided with a vacuum line such as a vacuum pump to evacuate the hollow cell and make a liquid crystalline material sucked into the hollow cell through another hole. After injection of a liquid crystalline material is completed, the holes are sealed with a sealer etc.

The light modulating material thus prepared may be utilized as a window material for buildings as it is or after a protective film such as a transparent film is provide over the surface of a transmitting substrate.

In the light modulating material, an average thickness of a liquid crystalline material may be not less than 3 μm to not more than 10 μm, preferably not less than 5 μm to not more than 60 μm. If less than 3 μm, a sufficient heat wave reflection could not be performed at an elevated temperature, while; if more than 100 μm, it is likely that a liquid crystal tends to be orientated sufficiently, which may lead to risk of reducing a reflectivity of a heat wave or a transparency.

The light modulating material of this invention may be employed as a window material for various buildings. If employed as a window material, the light in a visible light region during both winter and summer seasons may be transmitted through it and then a heating energy in winter season and an air conditioning energy in summer season may be designed to be reduced so that the material may contribute greatly to energy-saving.

This invention will be more illustatively explained by way of the following examples , but this invention is not to be limited to these examples. In the examples, various parameters were determined and calculated as set forth below.

Determination of phase transition temperature

It was determined using DSC 7 manufactured by Perkin-Elmer Co., Ltd. at a rate of rise or drop in temperature of 1K/min.

Determination of light transmittance

It was determined by scanning in the range of wavelength of 400–2000 nm using V 570 (manufactured by Nihon Bunko K.K.) equipped with an integrating sphere ISN-470 and taking data at 20 nm intevals.

Determination of light reflectance

It was determined by using the same equipment aste light transmittance and taking data at 20 nm intervals.

Light transmittance and light reflectance in a given wavelength region

Figure 5:
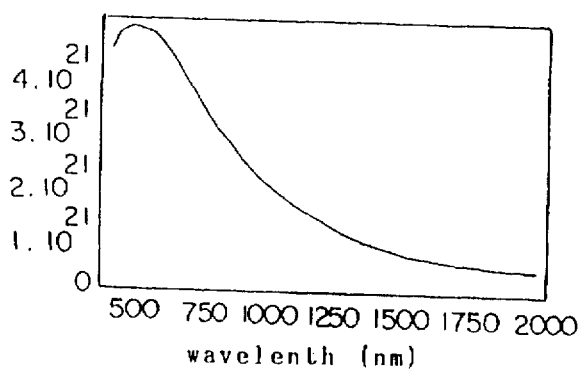
FIG. 5 is a spectrum chart of an energy distribution of a black body radiation at 6000K determined from a calculation program.

In order to determine from the measured transmittance spectrum and reflection spectrum according to the equations (1) and (2), Matematica Ver 2.2, a package software for mathematics, was used and they were calculated according to the following program:

First, a sun light spectrum is approximated to the spectrum of a black body radiation of 6000K is determined from the equation in the calculating program and the spectral wave form of FIG. 5 can be derived therefrom.

| Program | |
|---|---|
| h = 6.6262 10^−34; | Definition of blank constant |
| k = 1.3805 10^−23; | Definition of Boltzmn constant |
| c = 2.9979 10^8; | Definition of light velocity |
| f[r_] = h * c ^3/((r * 10^−9) ^5 * (Exp[h * c/(r * 10^−9 * k * 6000)]−1)(3) | Equation of black body radiation at 6000 K. |
| Plot[f[r], {r, 400, 2000}, Axes → False, Frame → True, FrameLabel → {"Wavelength/nm", "Energy/Wm − 3"}]; | Plot of black body radiation spectrum |
| c = {{2000, .86947}, {1980, .86479}, {1960, .86506} . . . | Measured transmittance |
| g = Interpolation[c]; | Interpolation to continued function |
| Plot[g[r], {r, 400, 2000}, Axes → False, Frame → True, PlotRange → {0, 1}]; | Plot of transmitted spectrum |
| Plot[{g[r] * f[r], f[r]}, {r, 400, 2000}, Axes → False, Frame → True, PlotStyle → {Dashing[{ }], Dashing[{0.02, 0.02}]}]; | Plot of spectra of transmitted light and sun light |
| NIntegrate[f[r] * g[r], {r, 400, 750}]/NIntegrate[f[r], {r, 400, 750}] | Calculation of transmittance |

The measured data of 81 points obtained by scanning a wavelength are interpolated with continuous functions using the Interpolation on the above package software. On the basis of these functions and the function for the black body radiation of 6000K, the light transmittance according to the equation (1) may be easily calculated using the function NIntegrate as prepared in the above package software. The light reflectance were determined form the spectral data according to the above methods.

EXAMPLE 1

The following compounds A, B and C were admixed at a rate of 0.1 g of A, 0.2 g of B and 0.3 g of C (an optical purity of 70 %) and the mixture was heated up to 120° C. and stirred until it became homogeneous to prepare a liquid crystalline material. A rubbing-treated polyimide thin layer was formed over the surface of a silica glass with a thickness of 1 mm. The glass was cut 2 cm square and a 20 μm spacer was put between two of the glass plates, the polyimide surfaces of the plates being directed inwardly, to prepare a glass cell. A liquid crystal was injected into the glass cell, the periphery of which was then sealed with an epoxy resin to prepare a sample for spectrum measurement. In this case, the thickness of a thin film was found to be 32 μm from the results of measurement of a thin film interference. The results of measurement of birefringence of the liquid crystalline material inserted as above, the phase change on temperature of the sample and the transmittance thereof are summarized in Table 1, while the transmittance and reflectance spectra at 273K, 288K, 298K and 313K are shown in FIGS. 1 and 2.

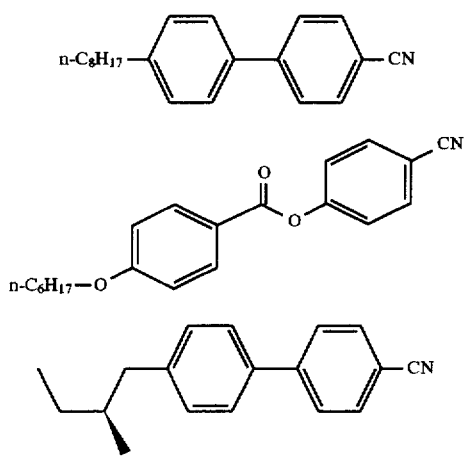

A

B

C

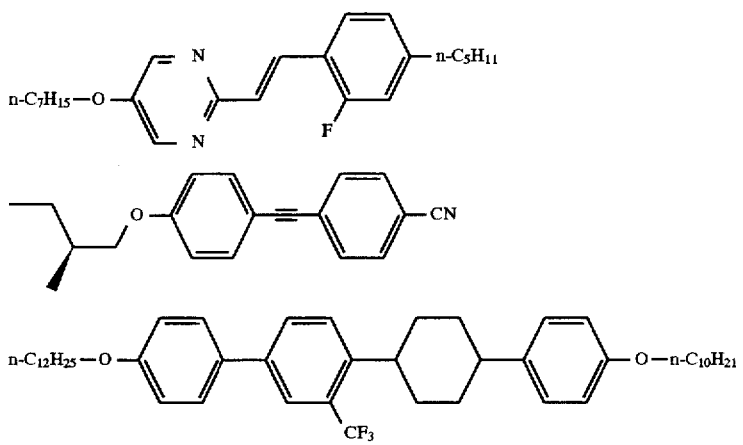

D

E

F

TABLE 1

Figure 4B:
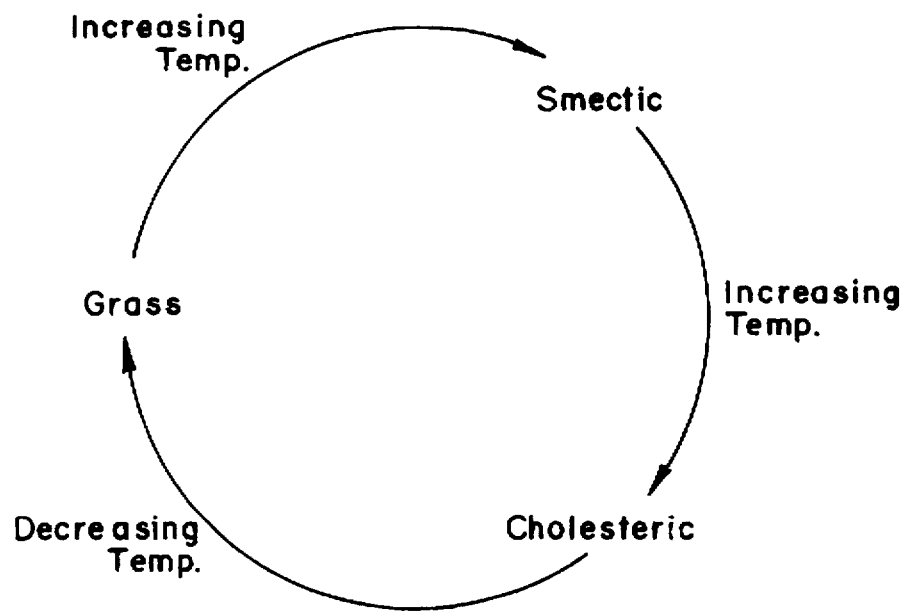
FIG. 4B is a schematic diagram illustrating an irreversible phase transition of a liquid crystalline material.
Figure 4A:
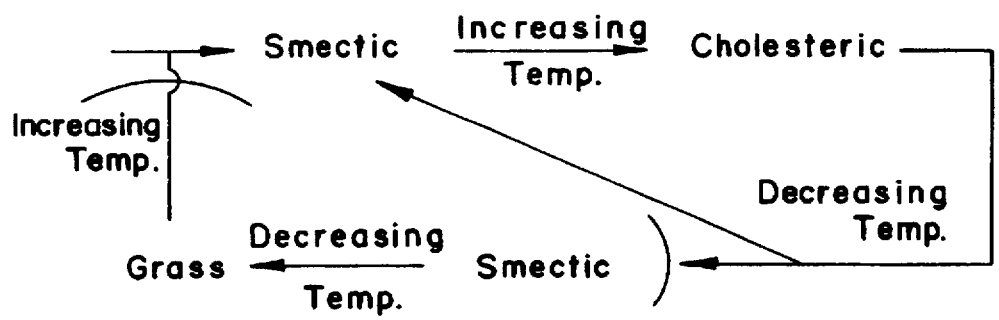
FIG. 4A is a reversible schematic diagram illustrating a phase transition of a liquid crystalline material.

| | Birefringence 30° C., 589.3 nm 0.21 | | |
|---|---|---|---|
| | Phase series (at lowered temperature) | | |
| Glass 272 K. | Smectic 290 K. | Cholesteric 320 K. | Isotropic phase |
| | 400–750 nm Transmittance | 750–2000 nm Transmittance | 750–2000 nm Reflectance |
| 273 K. | 85% | 88% | — |
| 288 K. | 83% | 91% | — |
| 298 K. | 82% | 39% | 55% |
| 313 K. | 85% | 40% | 53% | results of measurement of birefringence of the liquid crystalline material inserted as above, the phase change on temperature of the sample and the transmittance thereof are summarized in Table 2, while the transmittance and reflectance spectra at 273K, 288K, 298K and 313K are shown in FIGS. 3, 4A and 4B.

TABLE 2

| | Birefringence 30° C., 589.3 nm 0.23 | | |
|---|---|---|---|
| | Phase series (at lowered temperature) | | |
| Crystal 272 K. | Smectic 290 K. | Cholesteric 320 K. | Isotropic phase |
| | 400–750 nm Transmittance | 750–2000 nm Transmittance | 750–2000 nm Reflectance |
| 273 K. | 93% | 92% | — |
| 288 K. | 90% | 90% | — |
| 298 K. | 75% | 38% | 58% |
| 313 K. | 77% | 36% | 55% |

EXAMPLE 2

The following compounds D, E and F were admixed at a rate of 0.15 g of D, 0.2 g of E (an optical purity of 80%) and 0.3 g of F and the mixture was heated up to 100° C. and stirred until it became homogeneous to prepare a liquid crystalline material. A rubbing-treated polyimide thin layer was formed over the surface of a silica glass with a thickness of 1 mm. The glass was cut 2 cm square and a 20 μm spacer was put between two of the glass plates, the polyimide surfaces of the plates being directed inwardly, to prepare a glass cell. A liquid crystal was injected into the glass cell, the periphery of which was then sealed with an epoxy resin to prepare a sample for spectrum measurement. In this case, the thickness of a thin film was found to be 37 μm from the results of measurement of a thin film interference. The

EXAMPLE 3

Figure 6:
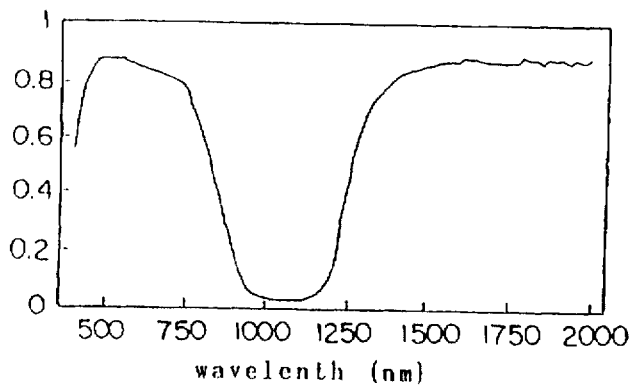
FIG. 6 is a spectrum chart showing transmittance determined from a calculation program.

The following compounds G and H were admixed at a rate of 0.15 g of G (an optical purity of 100%) and 0.22 g of H and the mixture was heated up to 130° C. and stirred until it became homogeneous to prepare a liquid crystalline material. A rubbing-treated poly(vinyl alcohol) thin layer was formed over the surface of a silica glass with a thickness of 1 mm. The glass was cut 2 cm square and a 20 μm spacer was put between two of the glass plates, the poly(vinyl alcohol) surfaces of the plates being directed inwardly, to prepare a glass cell. A liquid crystal was injected into the glass cell, the periphery of which was then sealed with an epoxy resin to prepare a sample for spectrum measurement. In this case, the thickness of a thin film was found to be 31 μm from the results of measurement of a thin film interference. The results of measurement of birefringence of the liquid crystalline material inserted as above, the phase change on temperature of the sample and the transmittance thereof are summarized in Table 3, while the transmittance and reflectance spectra at 273K, 288K, 298K and 313K are shown in FIGS. 5 and 6.

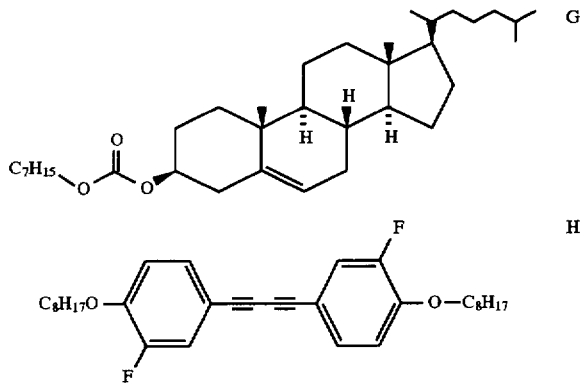

TABLE 3

| | Birefringence 30° C., 589.3 nm 0.18 | | |
|---|---|---|---|
| | Phase series (at lowered temperature) | | |
| Glass 258 K. | Smectic 293 K. | Cholesteric 337 K. | Isotropic phase |
| | 400–750 nm Transmittance | 750–2000 nm Transmittance | 750–2000 nm Reflectance |
| 273 K. | 87% | 88% | — |
| 288 K. | 85% | 84% | — |
| 298 K. | 78% | 32% | 60% |
| 313 K. | 75% | 35% | 58% |

EXAMPLE 4

Figure 7:
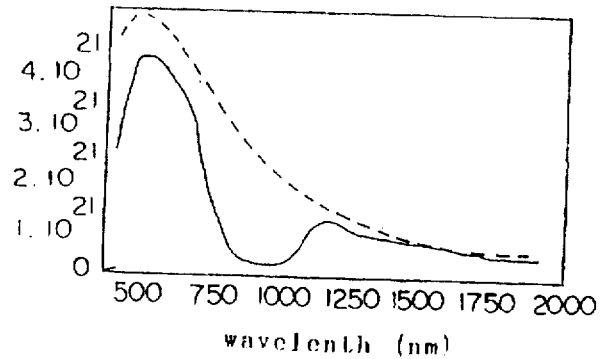
FIG. 7 is a spectrum chart showing an energy distribution of a transmitted light determined from a calculation program.
Figure 8:
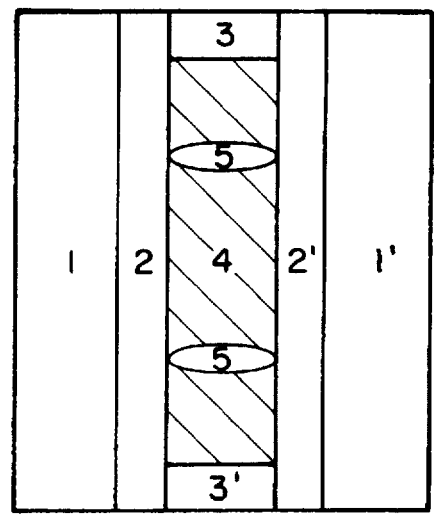
FIG. 8 is a sectional view showing one example of a laminate construction of the present light modulating material.

The following compounds I and J were admixed at a rate of 0.35 g of I (an optical purity of 100%) and 0.1 g of J and the mixture was heated up to 130° C. and stirred until it became homogeneous to prepare a liquid crystalline material. A rubbing-treated polyimide thin layer was formed over the surface of a silica glass with a thickness of 1 mm. The glass was cut 2 cm square and a 20 μm spacer was put between two of the glass plates, the polyimide surfaces of the plates being directed inwardly, to prepare a glass cell. A liquid crystal was injected into the glass cell, the periphery of which was then sealed with an epoxy resin to prepare a sample for spectrum measurement. In this case, the thickness of a thin film was found to be 30 μm from the results of measurement of a thin film interference. The results of measurement of birefringence of the liquid crystalline material inserted as above, the phase change on temperature of the sample and the transmittance thereof are summarized in Table 4, while the transmittance and reflectance spectra at 273K, 288K, 298K and 313K are shown in FIGS. 7 and 8.

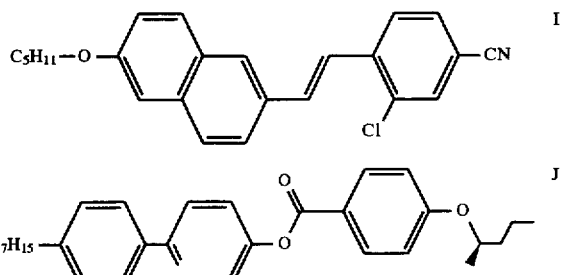

TABLE 4

| | Birefringence 30° C., 589.3 nm 0.32 | | |
|---|---|---|---|
| | Phase series (at lowered temperature) | | |
| Crystal 268 K. | Smectic 298 K. | Cholesteric 325 K. | Isotropic phase |
| | 400–750 nm Transmittance | 750–2000 nm Transmittance | 750–2000 nm Reflectance |
| 273 K. | 85% | 87% | — |
| 288 K. | 83% | 85% | — |
| 298 K. | 76% | 31% | 59% |
| 313 K. | 77% | 34% | 56% |

EXAMPLE 5

Figure 9:
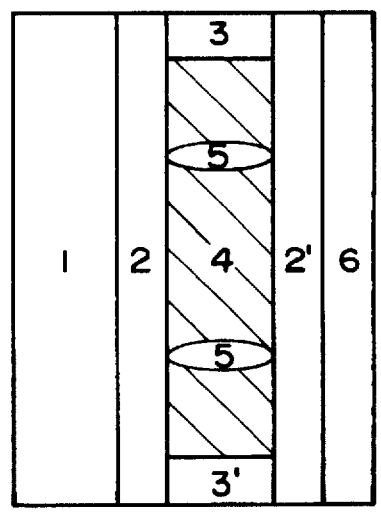
FIG. 9 is a sectional view showing another example of a laminate construction of the present light modulating material.
Figures 10A, 10B:
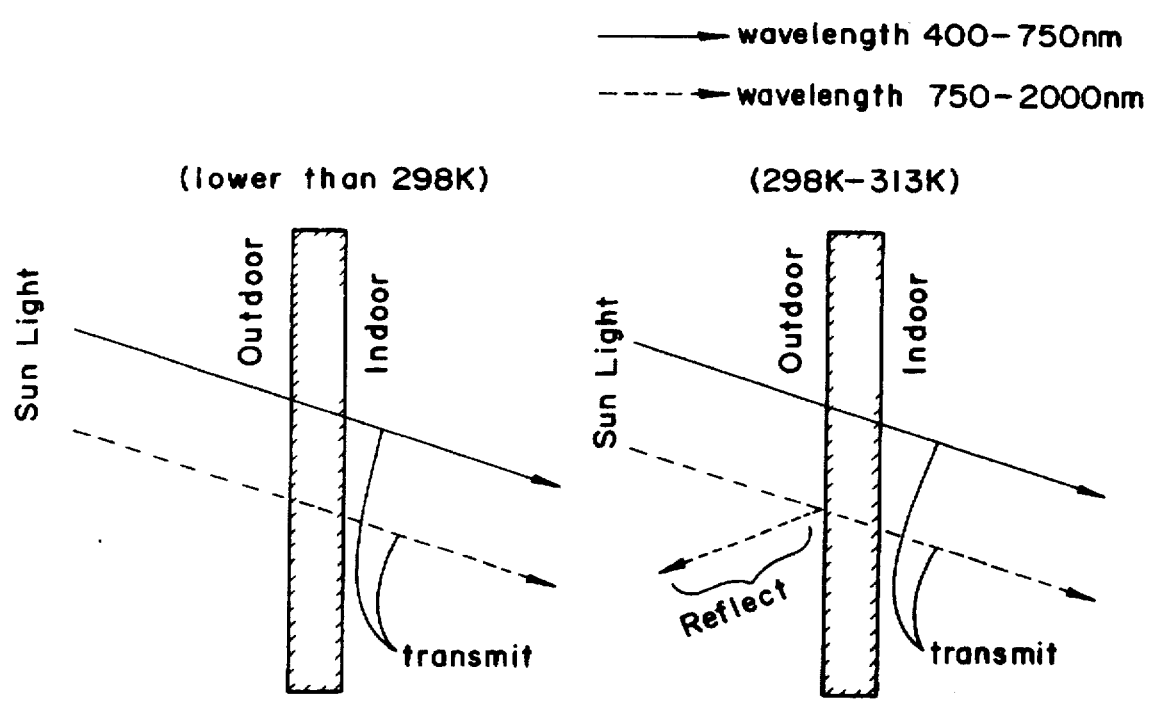
FIG. 10A is a schematic diagram illustrating the influence of sunlight on a light modulating material at a temperature lower than 298K.
FIG. 10B is a schematic diagram illustrating the influence of sunlight on a light modulating material at a temperature of 298K to 313° K.

The following compounds K and L were admixed at a rate of 0.15 g of K (an optical purity of 85%) and 0.45 g of L and the mixture was heated up to 130° C. and stirred until it became homogeneous to prepare a liquid crystalline material. An obliquely deposited layer of silicon was formed over the surface of a silica glass with a thickness of 1 mm. The glass was cut 2 cm square and a 20 μm spacer was put between two of the glass plates, the silicon surfaces of the plates being directed inwardly, to prepare a glass cell. A liquid crystal was injected into the glass cell, the periphery of which was then sealed with an epoxy resin to prepare a sample for spectrum measurement. In this case, the thickness of a thin film was found to be 29 μm from the results of measurement of a thin film interference. The results of measurement of birefringence of the liquid crystalline material inserted as above, the phase change on temperature of the sample and the transmittance thereof are summarized in Table 5, while the transmittance and reflectance spectra at 273K, 288K, 298K and 313K are shown in FIGS. 9, 10A and 10B.

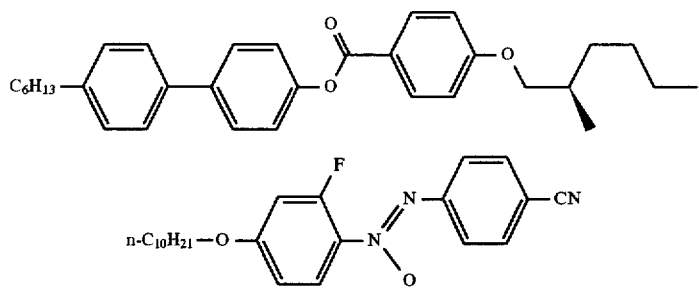

K

L

TABLE 5

| Glass 259 K. | Birefringence 30° C., 589.3 nm 0.20 Phase series (at lowered temperature) | | |
|---|---|---|---|
| | Smectic 295 K. | Cholesteric 331 K. | Isotropic phase |
| | 400–750 nm Transmittance | 750–2000 nm Transmittance | 750–2000 nm Reflectance |
| 273 K. | 84% | 81% | — |
| 288 K. | 81% | 77% | — |
| 298 K. | 77% | 31% | 52% |
| 313 K. | 77% | 31% | 53% |

TABLE 6

| Glass 266 K. | Birefringence 30° C., 589.3 nm 0.19 Phase series (at lowered temperature) | | |
|---|---|---|---|
| | Smectic 291 K. | Cholesteric 320 K. | Isotropic phase |
| | 400–750 nm Transmittance | 750–2000 nm Transmittance | 750–2000 nm Reflectance |
| 273 K. | 92% | 88% | — |
| 288 K. | 90% | 86% | — |
| 298 K. | 82% | 39% | 51% |
| 313 K. | 83% | 38% | 53% |

EXAMPLE 6

Figure 11:
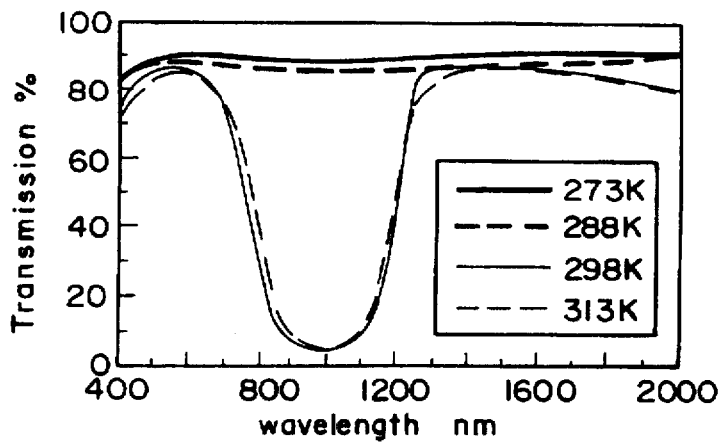
FIG. 11 is a transmission spectrum chart obtained in Example 1.
Figure 12:
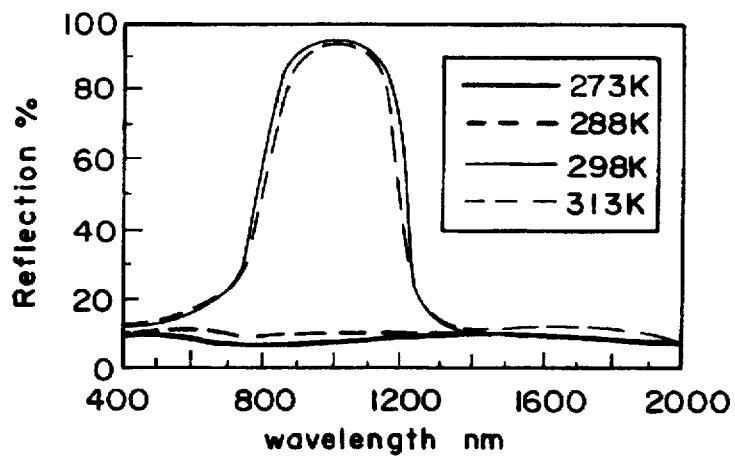
FIG. 12 is a reflection spectrum chart obtained in Example 1.
Figure 13:
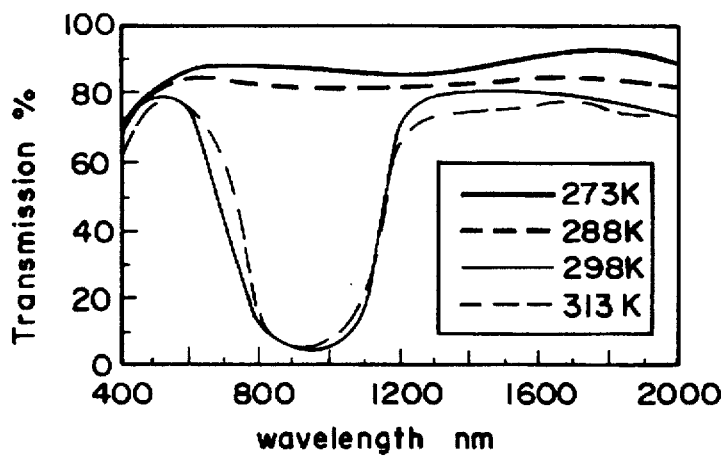
FIG. 13 is a transmission spectrum chart obtained in Example 2.
Figure 14:
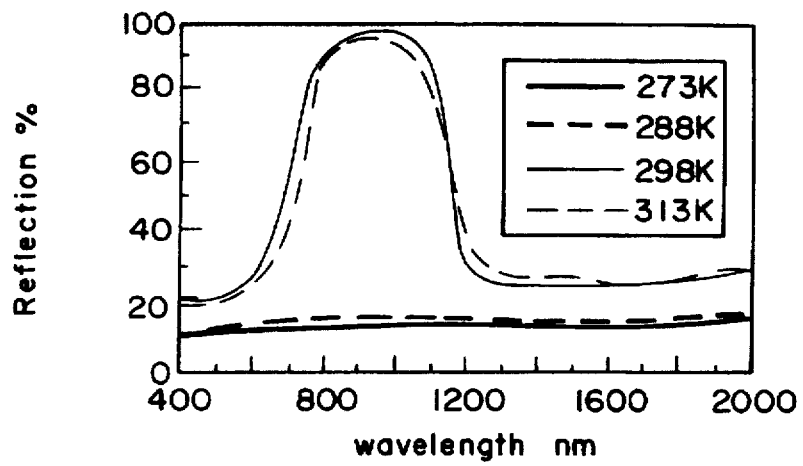
FIG. 14 is a reflection spectrum chart obtained in Example 2.
Figure 15:
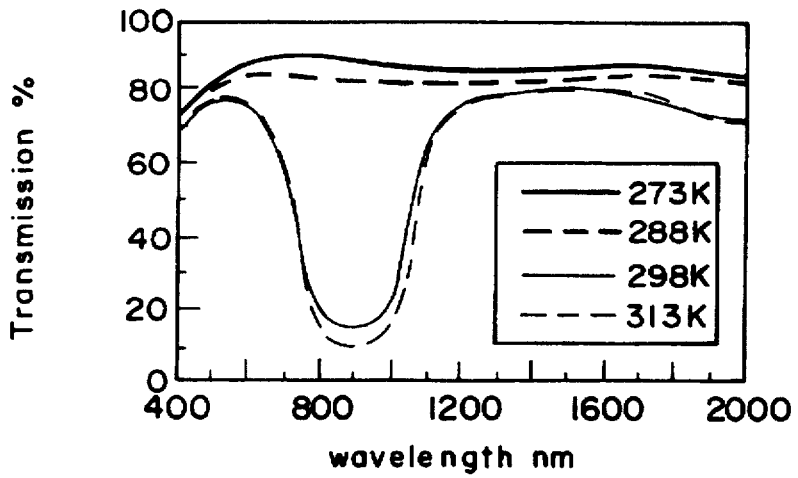
FIG. 15 is a transmission spectrum chart obtained in Example 3.
Figure 16:
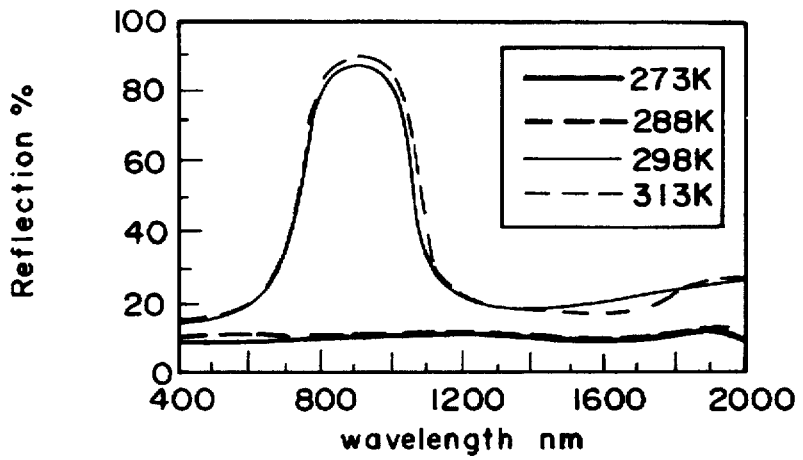
FIG. 16 is a reflection spectrum chart obtained in Example 3.
Figure 17:
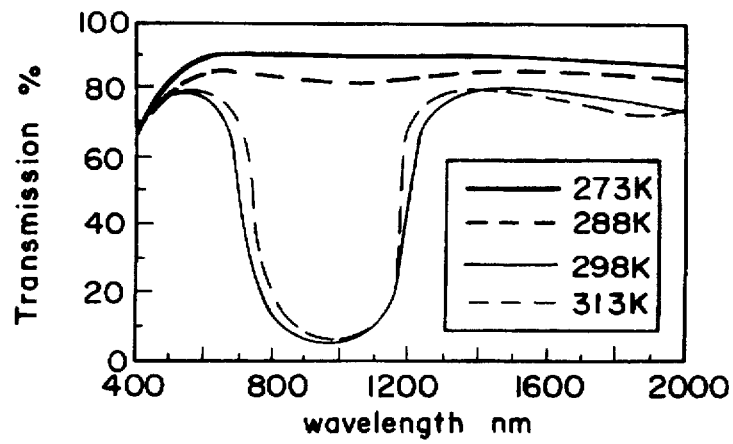
Figure 18:
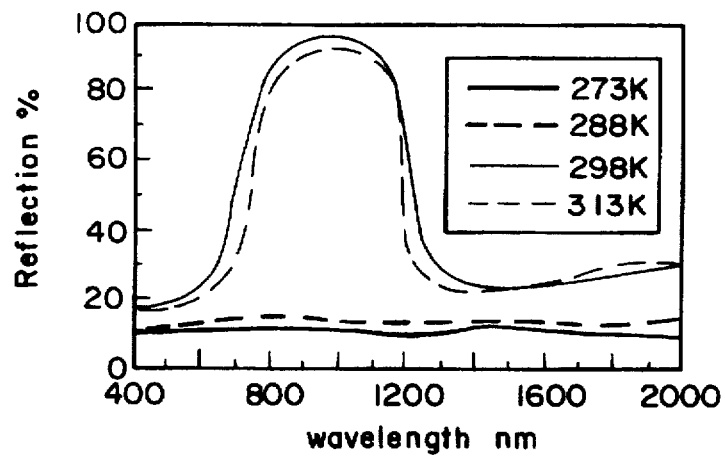
Figure 19:
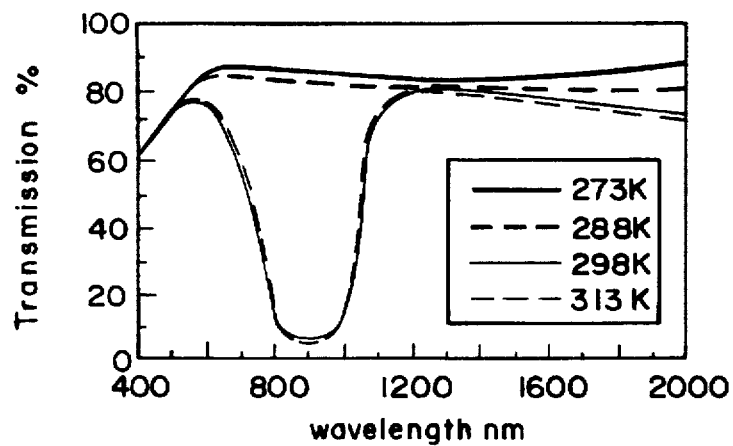
FIG. 19 is a transmission spectrum chart obtained in Example 5.
Figure 20:
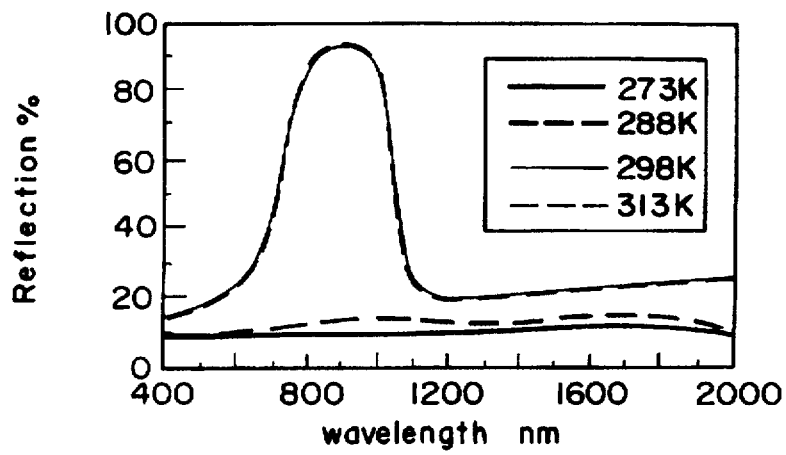
FIG. 20 is a reflection spectrum chart obtained in Example 5.
Figure 21:
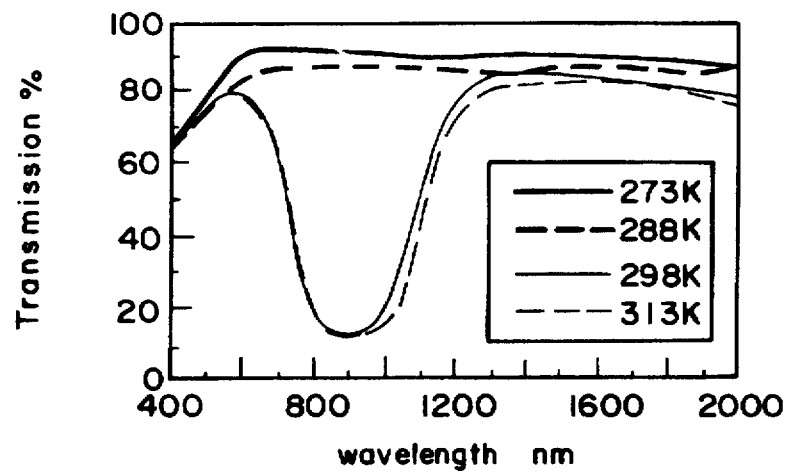
FIG. 21 is a transmission spectrum chart obtained in Example 6.
Figure 22:
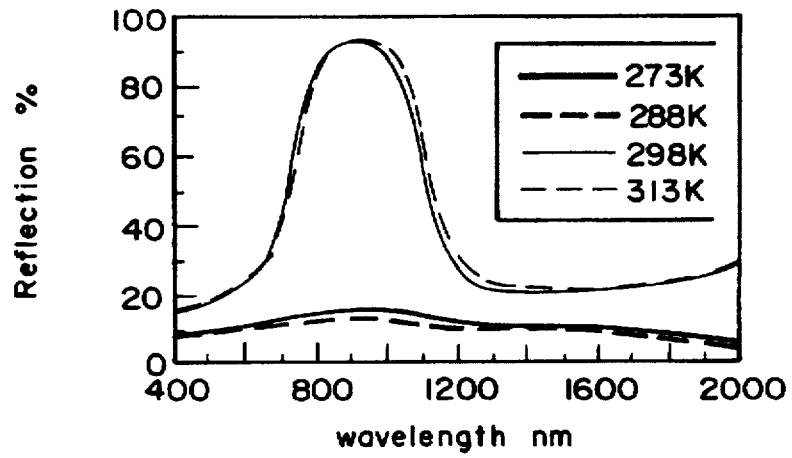
FIG. 22 is a reflection spectrum chart obtained in Example 6.

The following compounds M and N were admixed at a rate of 0.15 g of M (an optical purity of 100%) and 0.45 g of N and the mixture was heated up to 130° C. and stirred until it became homogeneous to prepare a liquid crystalline material. A rubbing-treated polyimide thin layer was formed over the surface of a silica glass with a thickness of 1 mm. The glass was cut 2 cm square and a 20 µm spacer was put between two of the glass plates, the polyimide surfaces of the plates being directed inwardly, to prepare a glass cell. A liquid crystal was injected into the glass cell, the periphery of which was then sealed with an epoxy resin to prepare a sample for spectrum measurement. In this case, the thickness of a thin film was found to be 38 µm from the results of measurement of a thin film interference. The results of measurement of birefringence of the liquid crystalline material inserted as above, the phase change on temperature of the sample and the transmittance thereof are summarized in Table 6, while the transmittance and reflectance spectra at 273K, 288K, 298K and 313K are shown in FIGS. 11 and 12.

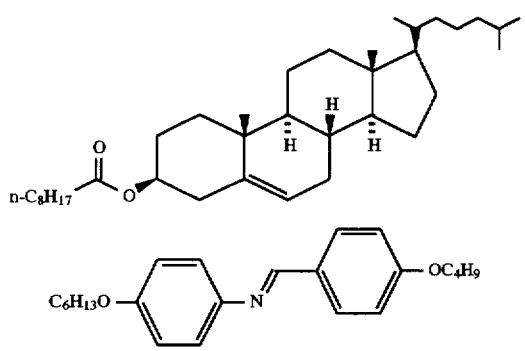

What is claimed is:

1. A light modulating material which comprises a laminating layer of a liquid crystalline material disposed over at least one transmitting substrate, said laminating layer having properties (a), (b) and (c):
   (a) a light transmittance of not less than 50% at a wavelength of 400–750 nm at a temperature of 273° K to 313° K.;
   (b) a light transmittance of not less than 60% at a wavelength of 750–2000 nm at a temperature of 273° K to less than 288° K.; and
   (c) a light transmittance of not more than 40% and a light reflectance of not less than 50% at a wavelength of 750–2000 nm at a temperature of 298° K. to 313° K.

2. A light modulating material as claimed in claim 1 wherein said liquid crystalline material has a clearing point of higher than 313K and a crystallization temperature of lower than 273K.

3. A light modulating material as claimed in claim 1 wherein said liquid crystalline material has a clearing point of higher than 313K and a glass transition temperature of lower than 288K.

4. A light modulating material as claimed in claim 1 wherein said liquid crystalline material has a cholesteric-smectic phase transition point in a temperature range from not lower than 288K to lower than 298K.

5. A light modulating material as claimed in claim 1 wherein said liquid crystalline material comprises at least one optically active liquid crystalline compound.

6. A light modulating material as claimed in claim 1 wherein said light transmitting substrate has liquid crystalline material-orientation capability.

7. A light modulating material as claimed in claim 6 wherein said light transmitting substrate includes an orientation layer on its surface.

8. A light modulating material as claimed in claim 6 wherein said light transmitting substrate is window glass.

9. A light modulating material as claimed in claim 1 wherein said liquid crystalline material has the structural formula

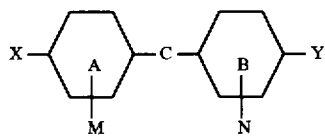

wherein A and B are ring radicals which are the same or different and are 1,4-phenylene, 2,5-pyridylene, 2,6-pyrimidine-1,4-diyl, 4,4'-biphenylene, cyclohexylbenzene-4,4'-diyl, 6-phenylpyridine-3,4'-diyl, 5-phenylpyridine-2,4'-diyl, 2-phenyl-1,3-pyrimidine-4,4'-diyl or 2,6'-naphthylnyl; C is a single bond, an ester, a trans-1,2-ethenediyl, acetylene, 1,3'-butadiyne-1,4-diyl, azoxy or azomethine; M and N are the same or different and are hydrogen, methyl, fluorine, chlorine or trifluoromethyl, with the proviso that M and N may be substituted on any position of rings A and B; and X and Y are the same or different and are straight chain alkyl containing 4 to 12 carbon atoms, an alkyl substituted with an alkyl group containing up to 3 carbon atoms at any position of the alkyl group, straight chain alkoxy of 4 to 12 carbon atoms, an alkoxy group substituted with an alkyl group containing up to 3 carbon atoms at any position of the alkoxy group or cyano.

10. A light modulating material as claimed in claim 9 wherein said liquid crystalline compound has the structural formula

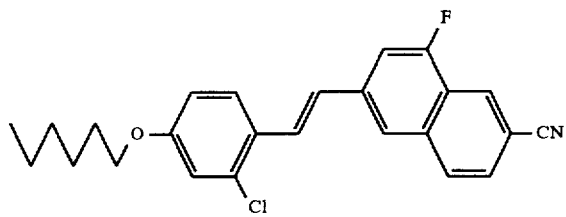

11. A light modulating material as claimed in claim 9 wherein said liquid crystalline compound has the structural formula

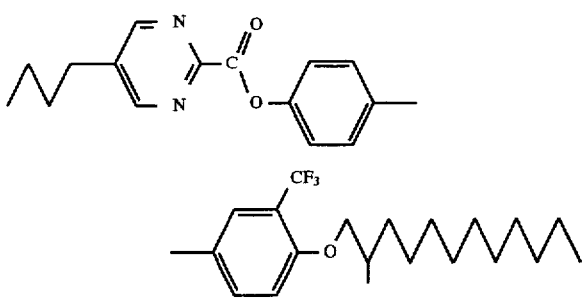

12. A light modulating material as claimed in claim 9 wherein said liquid crystalline compound has the structural formula

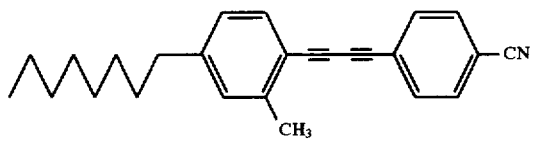

13. A light modulating material as claimed in claim 9 wherein said liquid crystalline compound has the structural formula 14. A light modulating material as claimed in claim 1 wherein said liquid crystalline material has the structural formula

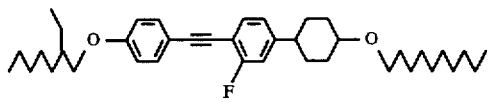

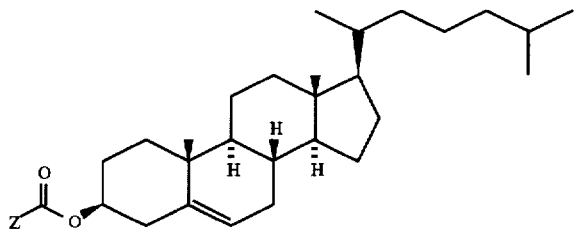

wherein Z is a straight chain alkyl of 1 to 9 carbon atoms or a straight chain alkoxy of 1 to 9 carbon atoms.

15. A light modulating material as claimed in claim wherein said liquid crystalline compound has the structural formula

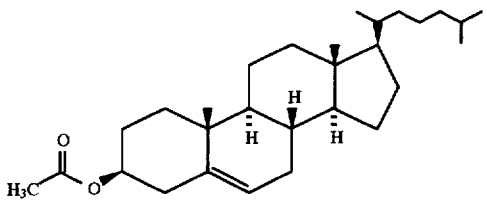

16. A light modulating material as claimed in claim 14 wherein said liquid crystalline compound has the structural formula

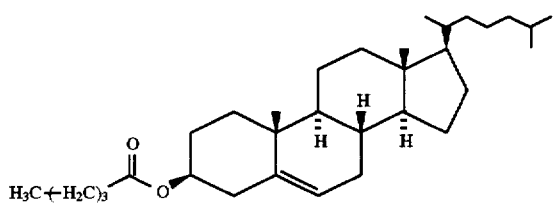

17. A light modulating material as claimed in claim 14 wherein said liquid crystalline compound has the structural formula

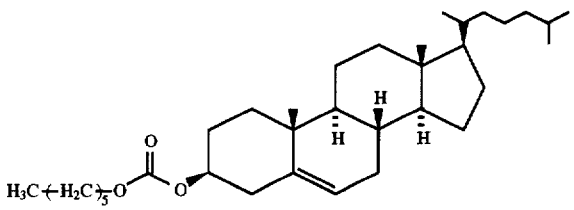

18. A light modulating material as claimed in claim 14 wherein said liquid crystalline compound has the structural formula

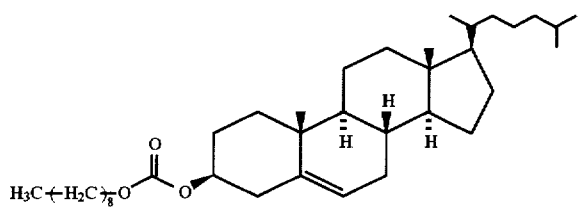

19. A light modulating material as claimed in claim 1 wherein said liquid crystalline compound comprises a mixture of at least two compounds, said compounds selected from the group consisting of

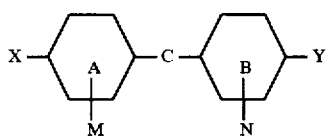

and

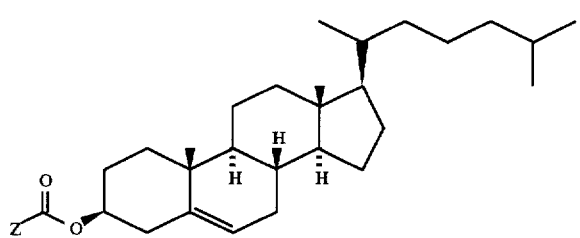

wherein A and B are the same or different and are 1,4-phenylene, 2,5-pyridylene, 2,6-pyrimidine-1,4-diyl, 4,4'-biphenylene, cyclohexylbenzene-4,4'-diyl, 6-phenylpyridine-3,4'-diyl, 5-phenylpyridine-2,4'-diyl, 2-phenyl-1,3-pyrimidine-4,4'-diyl or 2,6'-naphthylnyl; C is a single bond, an ester, a trans-1,2-ethenediyl, acetylene, 1,3'-butadiyne-1,4-diyl, azoxy or azomethine; M and N are the same or different and are hydrogen, methyl, fluorine, chlorine or trifluoromethyl, with the proviso that M and N may be substituted on any position of rings A and B; X and Y are the same or different and are straight chain alkyl containing 4 to 12 carbon atoms, an alkyl substituted with an alkyl group containing up to 3 carbon atoms at any position of the alkyl group, straight chain alkoxy of 4 to 12 carbon atoms, an alkoxy group substituted with an alkyl containing up to 3 carbon atoms at any position of the alkoxy group or cyano; and Z is a straight chain alkyl of 1 to 9 carbon atoms or a straight chain alkoxy of 1 to 9 carbon atoms.

20. A light modulating material as claimed in claim 19 wherein at least one compound utilized in said mixture is an optically active liquid crystalline compound.

\* \* \* \* \*

UNITED STATES PATENT AND TRADEMARK OFFICE
CERTIFICATE OF CORRECTION

PATENT NO. : 5,766,518

DATED : June 16, 1998

INVENTOR(S) : Takafuni Ishi

Page 1 of 2

It is certified that error appears in the above-identified patent and that said Letters Patent is hereby corrected as shown below:

On Title Page, Section [56], line 1: "5/1969" should read --9/1969--

Column 2, line 27: "optically ally" should read --optically--

Column 2, lines 64 and 67: "298K" should read --298°K--

Column 5, lines 17 and 18: Before "H." insert --(-- and after "1989)" insert --)--

Column 11, line 7: "AGNO$_3$" should read --AgNO$_3$--

Column 14, line 17: insert the following --reflectance may be calculated using the same program as above.--

UNITED STATES PATENT AND TRADEMARK OFFICE
CERTIFICATE OF CORRECTION

PATENT NO. : 5,766,518

DATED : June 16, 1998

INVENTOR(S) : Takafuni Ishi

It is certified that error appears in the above-identified patent and that said Letters Patent is hereby corrected as shown below:

Column 14, line 20: "Boltzmn" should read --Boltzman--

Column 14, line 29: "continued" should read --continuous--

Column 22, line 25, Claim 15: "claim wherein" should read --claim 14 wherein--

Signed and Sealed this

Fifteenth Day of May, 2001

Attest:

NICHOLAS P. GODICI

Attesting Officer

Acting Director of the United States Patent and Trademark Office